United States Patent
Musy et al.

(10) Patent No.: US 10,940,809 B2
(45) Date of Patent: Mar. 9, 2021

(54) INTERIOR TRIM PART AND METHOD OF MANUFACTURING THE SAME

(71) Applicant: Faurecia Innenraum Systeme GmbH, Hagenbach (DE)

(72) Inventors: Maxime Musy, Karlsruhe (DE); Valentin Geoffroy, Havange (FR)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 627 days.

(21) Appl. No.: 15/404,036

(22) Filed: Jan. 11, 2017

(65) Prior Publication Data

US 2017/0361782 A1 Dec. 21, 2017

(30) Foreign Application Priority Data

Nov. 26, 2015 (DE) ...................... 10 2015 015 313.7

(51) Int. Cl.
*B60R 13/00* (2006.01)
*B60R 13/02* (2006.01)
(Continued)

(52) U.S. Cl.
CPC ...... *B60R 13/0243* (2013.01); *B23K 35/0244* (2013.01); *B23K 35/286* (2013.01); *B29C 65/48* (2013.01); *B29C 66/7422* (2013.01); *B32B 1/00* (2013.01); *B32B 3/10* (2013.01); *B32B 5/02* (2013.01); *B32B 5/18* (2013.01);
(Continued)

(58) Field of Classification Search
CPC ......... B60R 13/00; B23K 35/00; B29C 65/00; C23C 16/00; C04B 35/00
See application file for complete search history.

(56) References Cited

U.S. PATENT DOCUMENTS

| 2009/0114341 | A1* | 5/2009 | Suzuki | B29C 51/16 156/322 |
| 2011/0190904 | A1* | 8/2011 | Lechmann | B29C 64/141 623/23.61 |
| 2011/0198358 | A1* | 8/2011 | Parent | A47J 36/02 220/573.1 |

FOREIGN PATENT DOCUMENTS

JP 01-222956 A * 9/1989

OTHER PUBLICATIONS

JPH01-222956A, English translated (Year: 1989).*

\* cited by examiner

*Primary Examiner* — Gordon Baldwin
*Assistant Examiner* — Mohammad Mayy
(74) *Attorney, Agent, or Firm* — Reising Ethington P.C.

(57) ABSTRACT

A process for producing an interior trim part (1) with a decorative layer situated on a first side (S1) thereof and forming a decorative pattern (M) for the interior of a motor vehicle, the process comprising the following steps:
(a) formation of at least one cutout configuration (R), defined by a predetermined decorative pattern (M), in a protective layer (120) situated on a first side (S1), which is situated on a first surface (110a) of the shell-shaped base body (110) made of a metallic material,
(b) deposition of sinterable decorative material on the first side (S1) in such a way that the decorative material, as an intermediate layer (150), covers at least the area in which the cutout configuration (R) defined by the decorative pattern (M) is formed in the protective layer (120),
(c) laser-sintering of the intermediate layer (150) inside the at least one cutout configuration defined by the decorative pattern (M),
(d) removal of the sinterable decorative material that is situated outside the at least one cutout configuration defined by the decorative pattern (M),
as well as an interior trim part (1).

17 Claims, 5 Drawing Sheets

Figure 1:
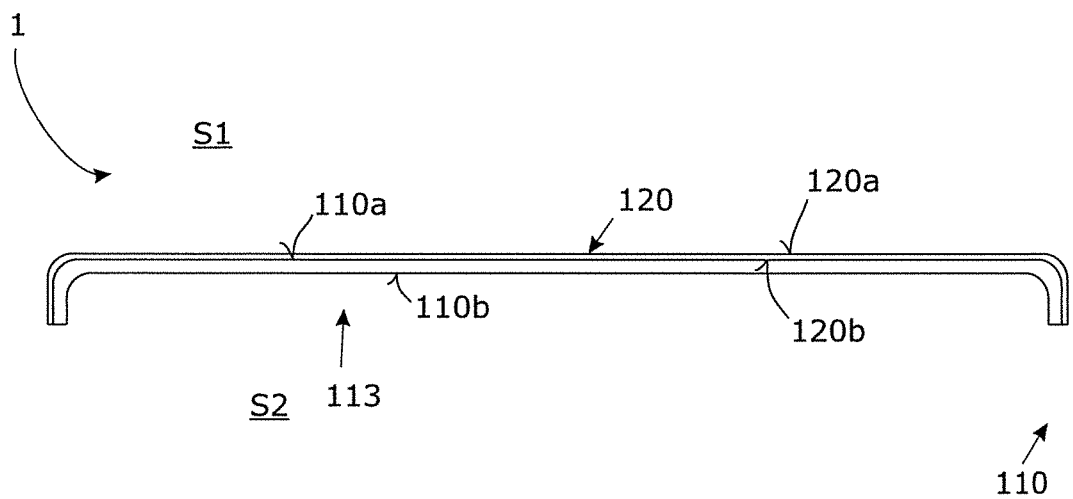

(51) Int. Cl.
  *B32B 7/12* (2006.01)
  *B32B 15/08* (2006.01)
  *B23K 35/02* (2006.01)
  *B32B 15/20* (2006.01)
  *B32B 27/06* (2006.01)
  *B23K 35/28* (2006.01)
  *B32B 3/10* (2006.01)
  *B32B 5/18* (2006.01)
  *B32B 15/04* (2006.01)
  *B32B 15/14* (2006.01)
  *C23C 28/00* (2006.01)
  *B32B 5/02* (2006.01)
  *B32B 1/00* (2006.01)
  *C23C 24/10* (2006.01)
  *B44C 1/22* (2006.01)
  *B44C 3/10* (2006.01)
  *B29C 65/48* (2006.01)
  *B29C 65/00* (2006.01)
  *B32B 9/00* (2006.01)
  *B32B 37/12* (2006.01)
  *C04B 35/16* (2006.01)
  *C04B 35/19* (2006.01)
  *C04B 35/195* (2006.01)
  *C04B 35/622* (2006.01)
  *C04B 35/64* (2006.01)
  *C08J 5/12* (2006.01)
  *B05D 5/06* (2006.01)
  *B05D 7/00* (2006.01)
  *B05D 3/06* (2006.01)
  *B29K 705/02* (2006.01)
  *B29L 31/30* (2006.01)

(52) U.S. Cl.
  CPC ............... *B32B 7/12* (2013.01); *B32B 9/005* (2013.01); *B32B 15/046* (2013.01); *B32B 15/08* (2013.01); *B32B 15/14* (2013.01); *B32B 15/20* (2013.01); *B32B 27/06* (2013.01); *B32B 37/12* (2013.01); *B44C 1/228* (2013.01); *B44C 3/10* (2013.01); *B60R 13/02* (2013.01); *C04B 35/16* (2013.01); *C04B 35/19* (2013.01); *C04B 35/195* (2013.01); *C04B 35/62222* (2013.01); *C04B 35/64* (2013.01); *C08J 5/12* (2013.01); *C23C 24/10* (2013.01); *C23C 28/00* (2013.01); *B05D 3/06* (2013.01); *B05D 5/06* (2013.01); *B05D 7/52* (2013.01); *B05D 2202/25* (2013.01); *B29K 2705/02* (2013.01); *B29L 2031/3005* (2013.01); *B32B 2255/06* (2013.01); *B32B 2255/20* (2013.01); *B32B 2255/26* (2013.01); *B32B 2255/28* (2013.01); *B32B 2260/021* (2013.01); *B32B 2260/046* (2013.01); *B32B 2451/00* (2013.01); *B32B 2605/003* (2013.01); *B32B 2605/08* (2013.01); *C04B 2235/665* (2013.01); *C08J 2400/00* (2013.01)

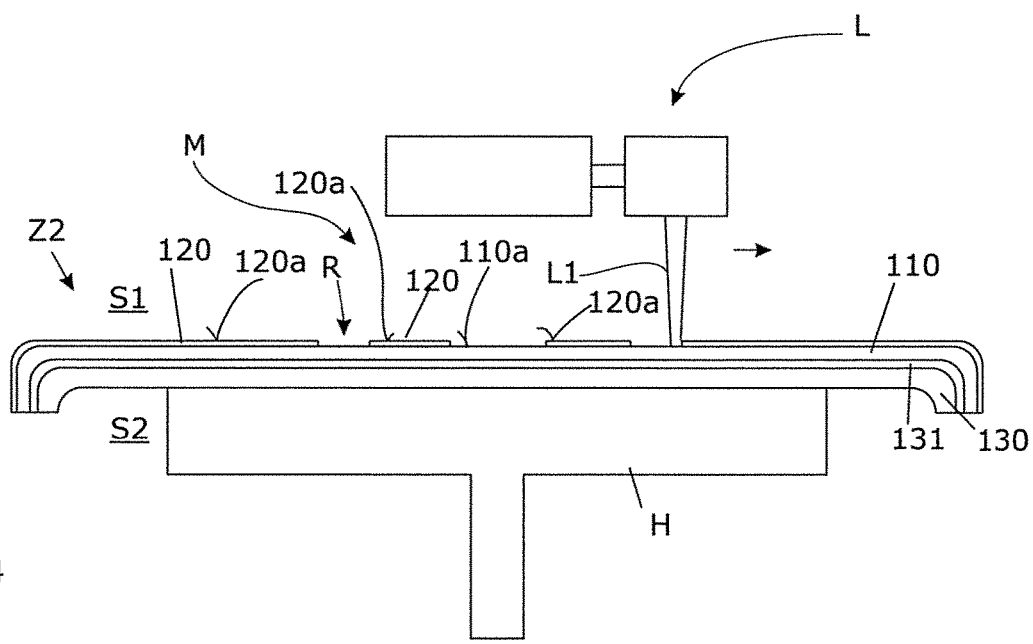
Fig. 4
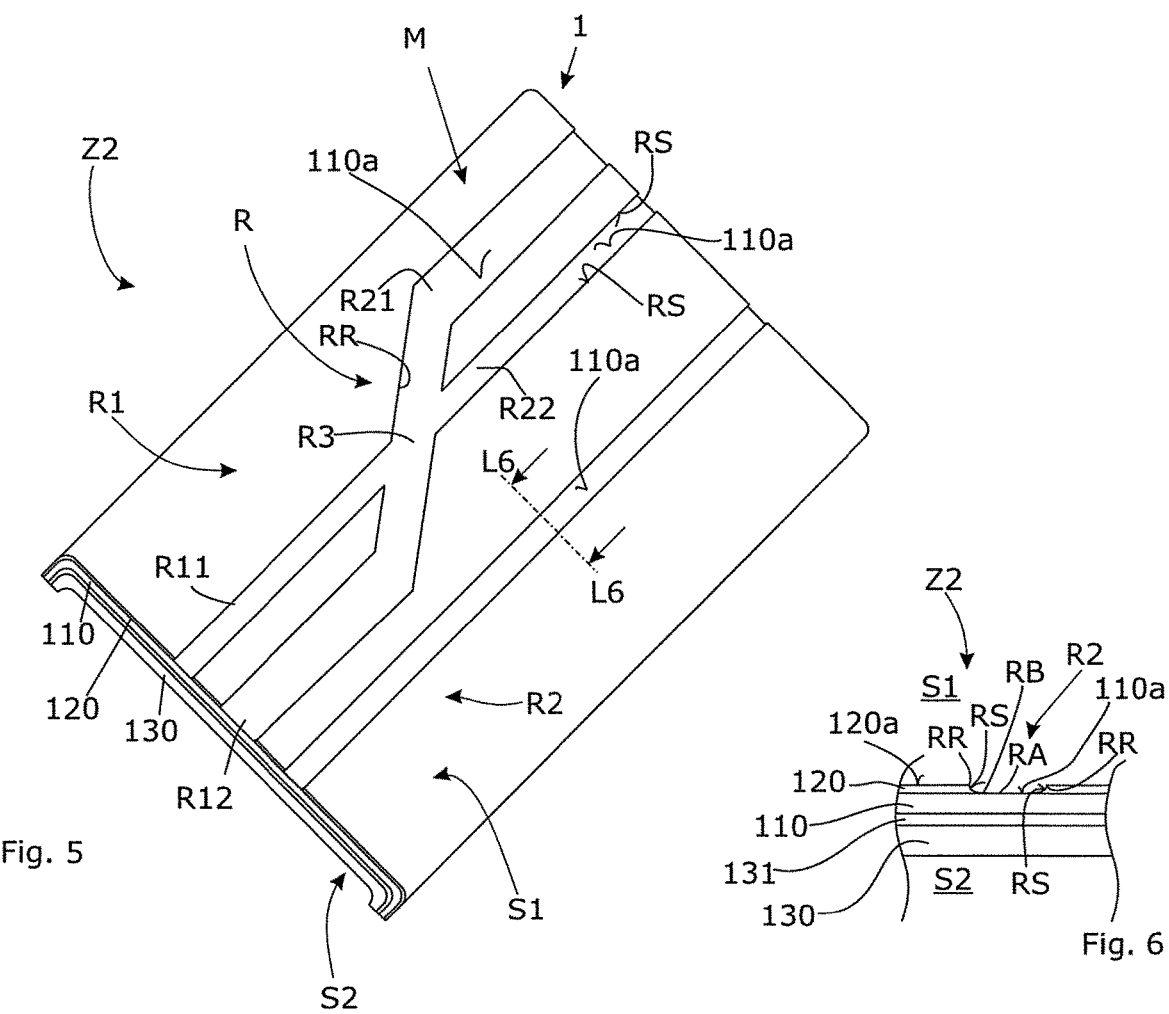
Fig. 5
Fig. 6

INTERIOR TRIM PART AND METHOD OF MANUFACTURING THE SAME

The invention relates to an interior trim part and a process for producing an interior trim part.

A process for producing an interior trim part with a ceramic layer is known from DE 43 22 801 C1.

The problem of the present invention is to provide a process for producing an interior trim part as well as an interior trim part, which can be produced with a decorative layer with a resistant and attractively formable decorative pattern or which comprises a decorative layer with a resistant and attractively formable decorative pattern.

This problem is solved with the features of the independent claims. Further embodiments are specified in the subclaims each relating back to the latter.

According to the invention, a process for producing an interior trim part with a decorative layer situated on a first side thereof and forming a decorative pattern M for the interior of a motor vehicle is provided, the process comprising the following steps:
(a) formation of at least one cutout configuration, defined by a predetermined decorative pattern, in a protective layer situated on a first side, which is situated on a first surface of the shell-shaped base body made of a metallic material,
(b) deposition of sinterable decorative material on the first side in such a way that the decorative material, as an intermediate layer, covers at least the part of the area in which the cutout configuration defined by the decorative pattern is formed in the protective layer,
(c) laser-sintering of the intermediate layer inside the cutout configuration defined by the decorative pattern in order to produce at least one hardened portion of the intermediate layer situated inside said cutout configuration,
(d) removal of the sinterable decorative material that is situated outside the cutout configuration defined by the decorative pattern, so that the at least one hardened portion of the intermediate layer and the protective layer outside the latter form the decorative layer with the predetermined decorative pattern.

"Cutout configuration" is understood here to mean at least one cutout of the protective layer, wherein the at least one cutout is constituted as a through-opening in particular extending in a planar manner, which arises or is produced by a complete removal of the protective layer which has taken place over a limited area corresponding to the size of the through-opening.

In an embodiment of the process according to the invention, provision is made such that the formation of the cutout configuration in the protective layer defined by a predetermined decorative pattern is produced by vaporisation of the material of the protective layer according to a predetermined pattern. A laser is preferably used for this.

In an embodiment of the process according to the invention, provision is made such that the sinterable decorative material contains a mineral substance.

In an embodiment of the process according to the invention, provision is made such that a dispersion of sinterable decorative material takes place when sinterable decorative material is deposited on the first side.

In an embodiment of the process according to the invention, provision is made such that the sinterable decorative material is deposited in powder form on the first side.

The intermediate layer of sinterable material preferably has a thickness between 1 µm and 500 µm and in particular a thickness between 5 µm and 100 µm.

To produce a mineral hardened portion of the intermediate layer, mineral and in particular ceramic sinterable decorative material can be deposited on a first surface of the base body, which is hardened in particular by sintering in a subsequent step. The mineral material to be deposited can be a mixture of a mineral substance with a plastic and in particular a thermoplastic.

The process according to the invention has the advantage that the protective layer is removed only at those points or in those areas at or in which the intermediate layer is sintered. The metallic surface outside the decorative pattern thus remains protected by the protective layer.

Only local heating of an intermediate product involved in the given process step occurs with laser sintering, so that melting of any plastic part that may be used can be avoided.

In a sequence of process steps (a) to (d), very precise decorative patterns can be produced on the surface of the given intermediate product, which decorative patterns can be reproduced extremely well. This applies especially in the case where the same laser and optionally the same clamping device are used for the sintering as for the formation of the cutout configuration.

In the process according to the invention, it is possible to produce a sinterable substance and in particular a sintered mineral substance in the form of a predetermined precise pattern as a decorative layer on an intermediate layer. The decorative material layer is preferably constituted as a mineral and as a hard layer.

The sinterable material of the decorative material layer can be a mixture of a mineral substance or mineral material with a plastic and in particular a thermoplastic. The mineral material of the decorative material layer can be formed from or comprise ceramic materials, such as for example borosilicate or an aluminosilicate, which is for example alkali aluminosilicate or alkaline-earth aluminosilicate The decorative pattern produced in each case can thus be quickly and easily changed, since the partial removal of the protective layer and the sintering on the basis of specifications with regard to the predetermined decorative pattern can be stored by way of a set of coordinate data in the sintering device.

As a result of the possibility of producing very precise decorative patterns reliably on an intermediate product involved in the given process step, the quantity of rejects in the production process can be kept very small.

The sequence of process steps according to the invention also ensures that the plastic reinforcement reliably remains intact in subsequent process steps.

In an embodiment of the process according to the invention, provision is made such that the application of the plastic reinforcement on the second surface of the base body takes place by adhesive bonding of the same and an adhesive layer is applied between the second surface of the base body and the plastic reinforcement.

In an embodiment of the process according to the invention, provision is made such that an application of a plastic reinforcement takes place on the second surface of the base body, wherein, by back-moulding of the base body at the second surface thereof, the plastic reinforcement is applied thereon.

In an embodiment of the process according to the invention, the sinterable decorative material comprises a mineral substance.

The mineral material or the mineral substance that is used for the decorative material is preferably formed from ceramic materials, such as for example borosilicate or an aluminosilicate, which for example can be alkali aluminosilicate or alkaline-earth aluminosilicate. The mineral material or the mineral substance can also comprise these materials.

According to a further aspect of the invention, an interior trim part is provided, said interior trim part comprising:
- a shell-shaped base body made of a metallic material,
- a protective layer, which is situated on a first surface of the shell-shaped base body, wherein at least one cutout configuration defining a decorative pattern is formed in the protective layer,
- a decorative material layer made of a sintered material, which at least partially fills the cutout configuration in the protective layer.

The interior trim part can furthermore comprise a plastic reinforcement, which is applied in a planar manner to a second surface of the shell-shaped base body situated opposite to the first surface.

In an embodiment of the interior trim part according to the invention, the base body is formed from aluminium or an aluminium alloy or comprises a metallic material and in particular aluminium or aluminium alloy.

In an embodiment of the interior trim part according to the invention, the plastic reinforcement is adhesively bonded to the second surface of the base body.

The term "intermediate product" is understood in the description of this invention to mean each product arising in intermediate steps within the process according to the invention before completion of the interior trim part to be produced. According to this definition, an intermediate product arises in each intermediate step, but not in the last process step of the process for producing the interior trim part.

Alternatively, provision can be made such that the plastic reinforcement is formed by back-moulding of the base body at the second surface thereof.

Figure 2:
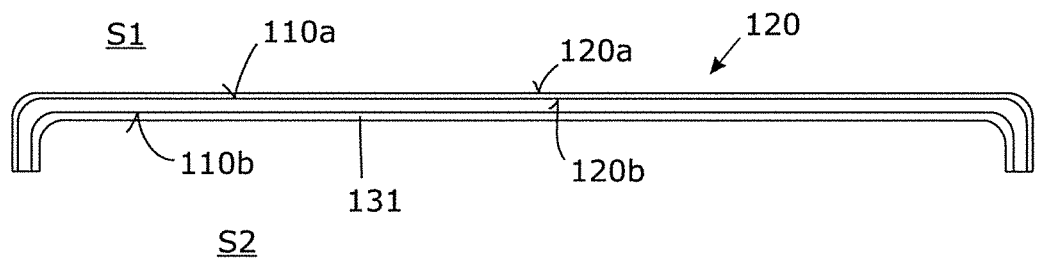
Figure 3:
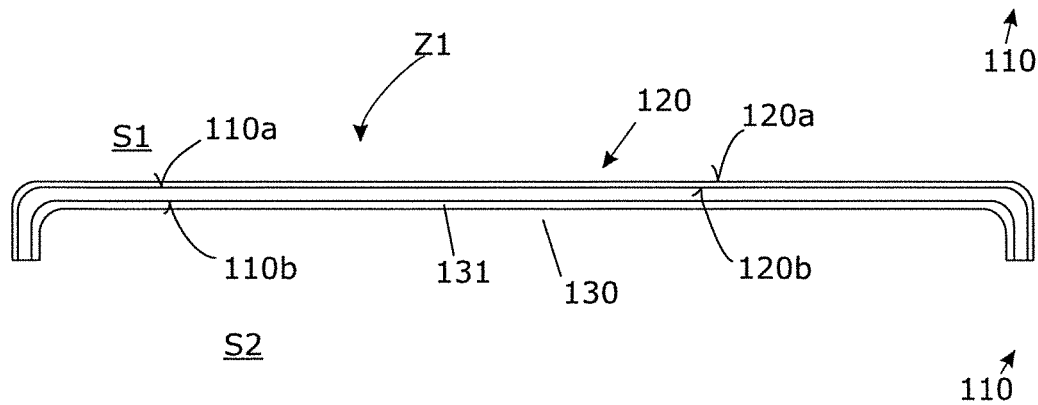
Figure 7:
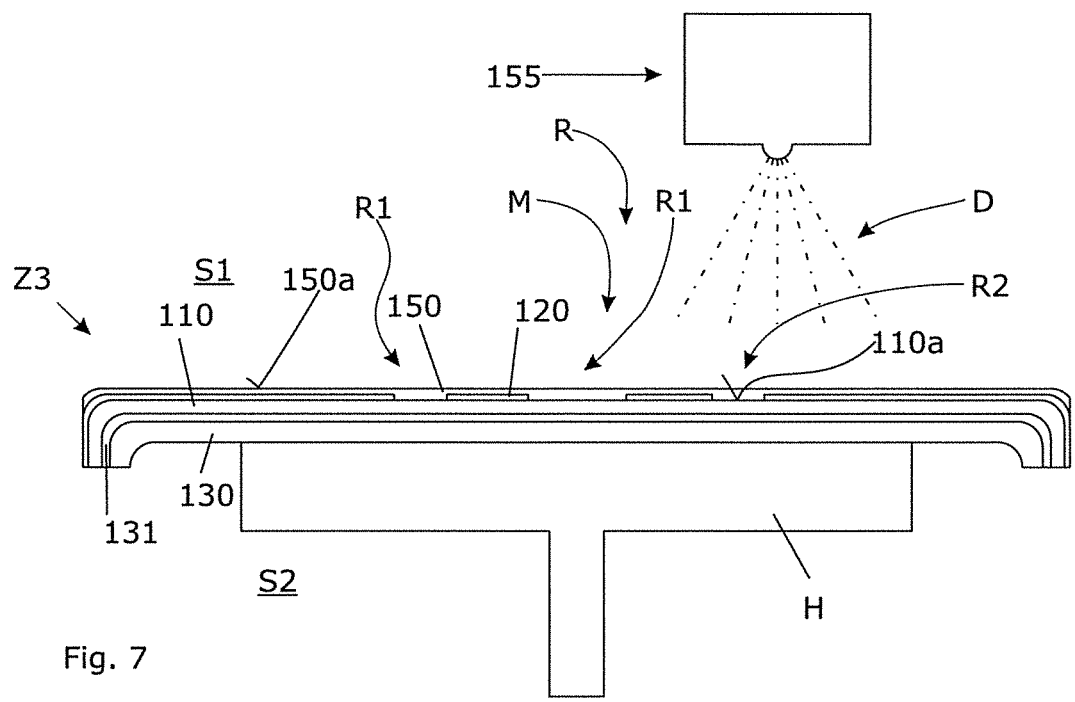
Figure 8:
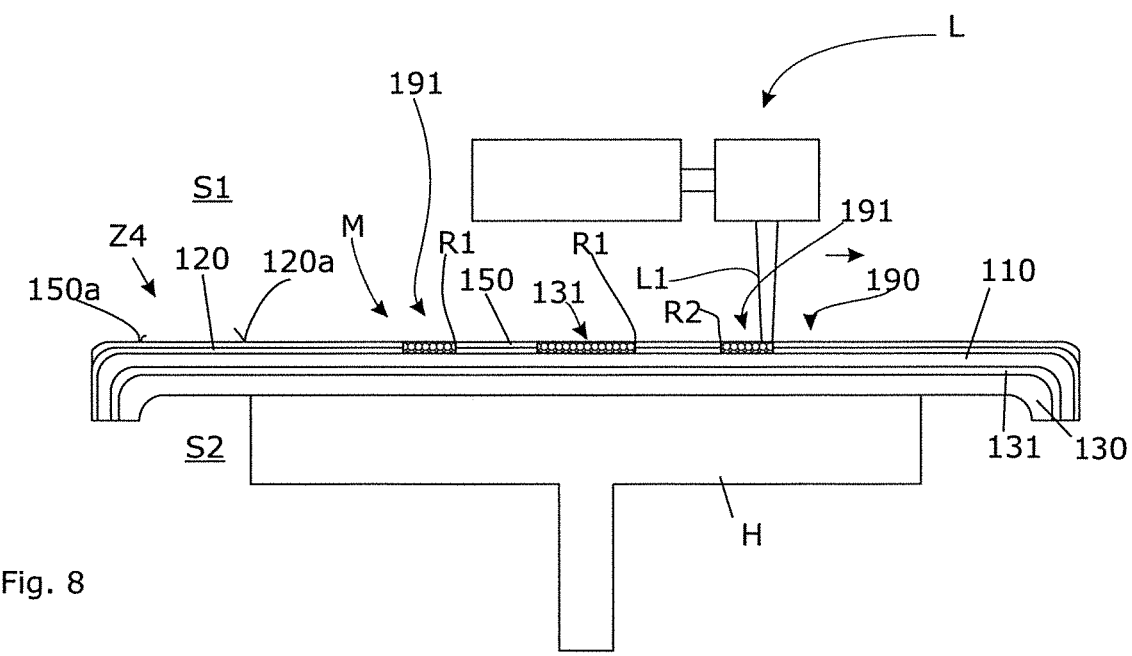
Figure 9:
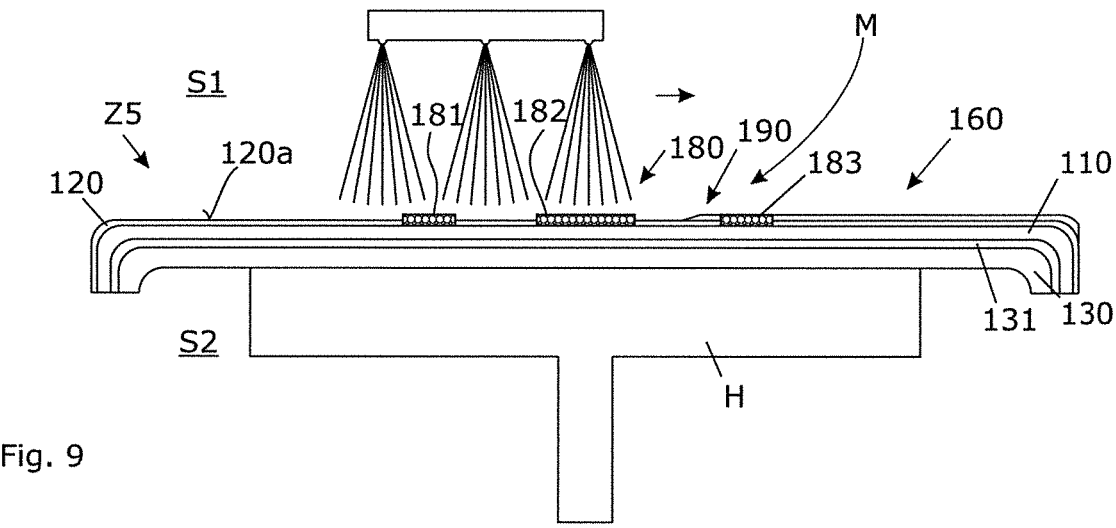
Figure 10:
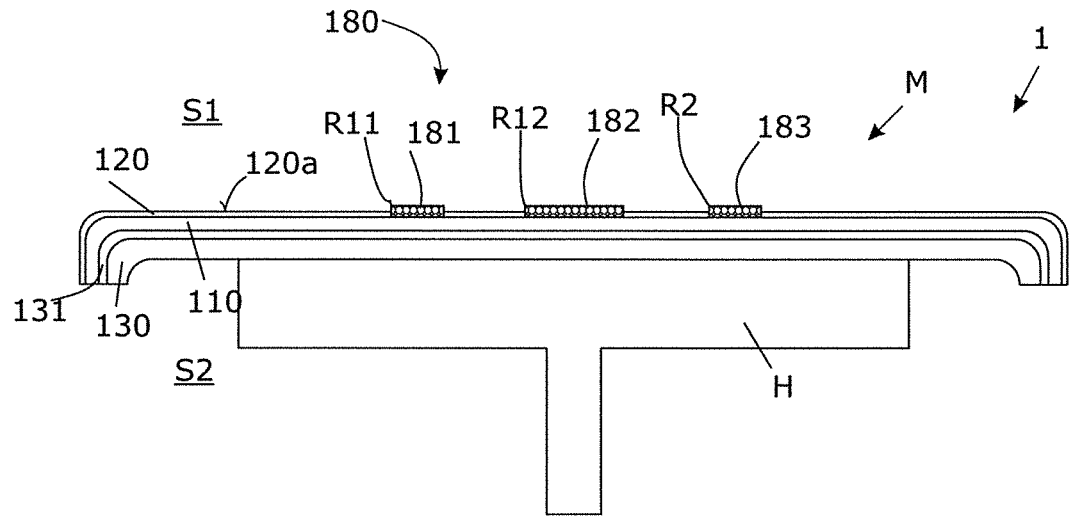
Figure 11:
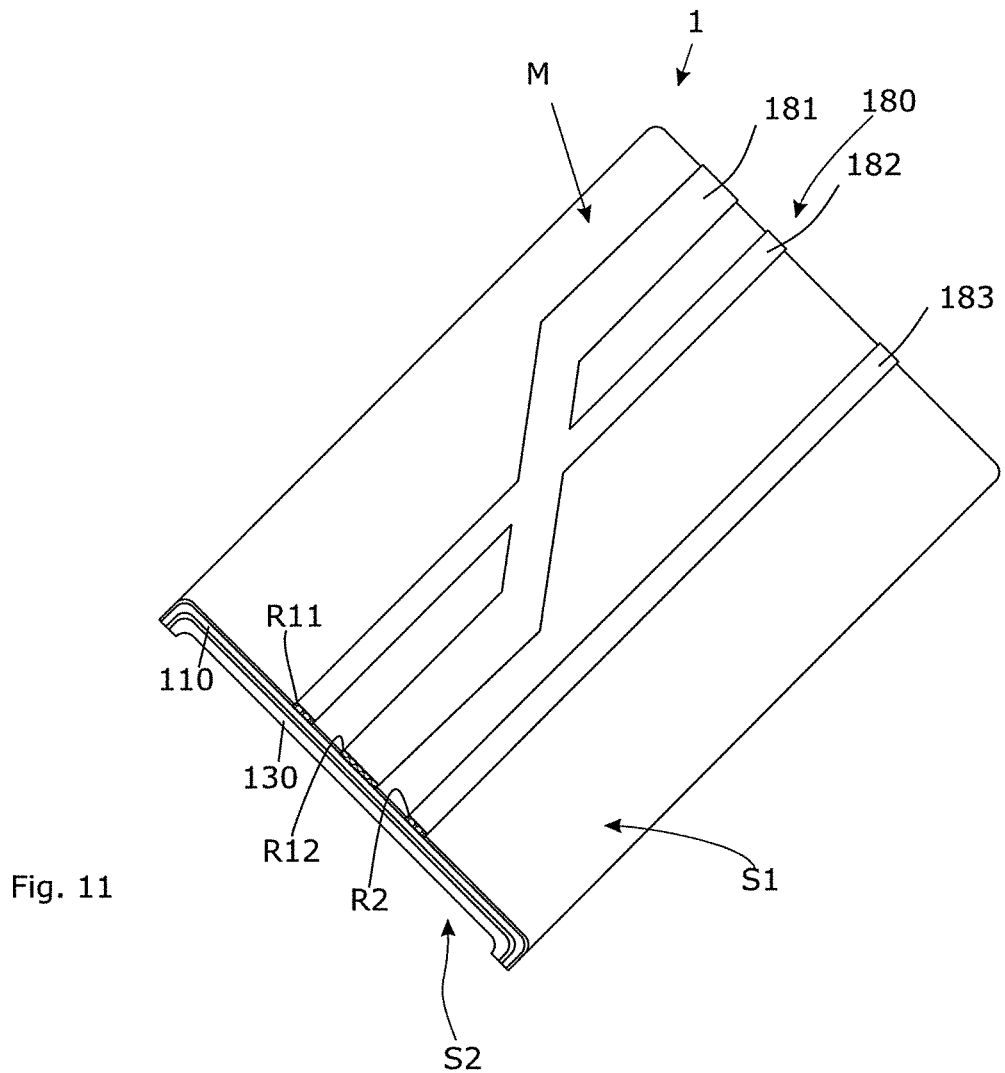

Embodiments of the invention are described below with the aid of the appended figures, in which:

FIG. 1 shows a cross-sectional drawing to represent an initial state of the process according to the invention for producing an interior trim part, wherein the base body is prepared from a metallic material, wherein a protective layer covers at least in sections a first surface of the base body, FIG. 2 shows a cross-sectional drawing to represent an optional further step of the process, according to which, for the application of a plastic reinforcement on a second surface, an adhesive layer has been arranged on the second surface, FIG. 3 shows a cross-sectional drawing to represent an optional further step of the process, in which the plastic reinforcement has been applied to the second surface of the base body by means of the adhesive layer, FIG. 4 shows a cross-sectional drawing to represent a further step of the process, in which the protective layer is removed in sections by vaporisation by means of a laser according to a predetermined decorative pattern, so that a cutout configuration defined by the decorative pattern is formed in the protective layer, FIG. 5 shows a perspective representation of an embodiment of an intermediate product with the base body and the protective layer, in which the cutout configuration defined by the decorative pattern is formed, FIG. 6 shows a detail of the embodiment of the intermediate product according to FIG. 5 in a cross-sectional representation as a section along line L6-L6 drawn in FIG. 5, FIG. 7 shows the representation of a process step, in which a dispersion or liquid of sinterable and in particular mineral material is deposited, as an intermediate layer, on a first side of the intermediate product, in such a way that said intermediate layer covers at least the area in which the cutout configuration defined by the decorative pattern is formed in the protective layer, FIG. 8 shows the representation of a process step, in which laser sintering is carried out on the first side or the outer surface of the intermediate layer inside the cutout configuration defined by the decorative pattern, FIG. 9 shows the representation of a process step, in which a removal of the dispersion or liquid of sinterable material present in the non-sintered state takes place from the area which is situated outside the cutout configuration defined by the decorative pattern, FIG. 10 shows a cross-sectional representation of the production state that is reached after the step according to FIG. 9 has been carried out, so that the interior trim part is available, and FIG. 11 shows a perspective representation of an embodiment of the interior trim part, which has been produced by the aforementioned process steps.

According to the process according to the invention, an interior trim part 1 with a decorative layer situated at a first side S1 thereof and forming a decorative pattern M is produced for the interior of a motor vehicle. The interior trim part can for example be a door panel for application on the side of the vehicle door facing the interior, an instrument panel or an armrest.

A shell-shaped base body 110 made of a metallic material, which extends in a planar manner, is used for interior trim part 1 produced according to the process according to the invention. The planar extension of base body 110 is constituted by first surface 110a and a second surface 110b situated opposite to first surface 110a. First surface 110a is situated at a first side S1 of base body 110. A first side S1 and a second side S2 of interior trim part 1 are defined for the subsequent description, wherein first surface 110a is situated facing first side S1 and second surface 110b is situated facing second side S2. Shell-shaped base body 110 preferably has in its main area the shape of interior trim part 1 to be produced, apart from further layers to be deposited on base body 110 in the production of interior trim part 1. If need be, base body 110 can however also be further shaped or processed.

The base body 110 can have a thickness between 0.1 mm and 10 mm, preferably up to 5.0 mm and in particular a thickness between 0.1 mm and 2.0 mm. The base body 110 is formed from a metallic material or comprises a metallic material. In particular, provision can be made such that base body 110 is formed from or comprises aluminium or an aluminium alloy.

A protective layer 120 is situated on first surface 110a of shell-shaped base body 110. Provision can be made such that protective layer 120 extends over entire first surface 110a. Provision can also be made such that protective layer 120 extends only over a part, i.e. in sections, over first surface 110a. The material of base body 110 can be a metal, in particular aluminium or at least in part an oxide of a metal and in particular aluminium oxide. Base body 110 can be formed from or comprises a basic body and a surface layer covering the latter, wherein the material basic body is made of metal and in particular aluminium and the surface layer is made of an oxide of a metal and, when the material basic body is formed from aluminium, of an aluminium oxide. In particular, provision can be made such that the surface layer constitutes surface 110a. The surface layer can cover the basic body in sections or completely.

The protective layer is formed from or comprises plastic, e.g. is formed from or comprises a UV hardened lacquer of urethane acrylate.

A further step can optionally be provided, wherein a plastic reinforcement 130 is applied as a layer and in particular in a planar manner on second surface 110b of shell-shaped base body 110 for the formation of intermediate product Z1. Alternatively, provision can for example be made such that a rib-shaped plastic reinforcement 130 is applied to second surface 110b of shell-shaped base body 110. According to an embodiment, provision can be made such that plastic reinforcement 130 only partially covers second surface 110b. In the state shown in FIG. 3, plastic reinforcement 130 is applied as a layer and in a planar manner to second surface 110b of base body 110.

Plastic reinforcement 130 can serve to stabilise and in particular to increase the strength of shell-shaped base body 110.

Plastic reinforcement 130 can for example be constituted as a layer, which covers second surface 110b in a planar manner or covers a main area thereof. Plastic reinforcement 130 can also be formed from a plurality of strips.

The plastic reinforcement can be a plastic with or without additives and for example a thermoplastic or a foam. The plastic reinforcement can also be a fibre-reinforced plastic.

The application of plastic reinforcement 130 to second surface 110b can take place by adhesive bonding. FIG. 2 represents how an adhesive layer 131 is applied to second surface 110b of base body 110, in order to apply plastic reinforcement 130 to second surface 110b by means of adhesive layer 131 (FIG. 3). Alternatively, provision can be made such that base body 110 is back-moulded with plastic at its second surface 110b, optionally without an adhesive layer, so that there is formed on second surface 110b a reinforcement layer connected to the latter in a planar manner, said reinforcement layer at least partially covering second surface 110b.

According to the invention, a process step represented in FIG. 4 is provided for the formation of an intermediate product Z2, wherein at least one cutout configuration R defined by a predetermined decorative pattern M is formed in protective layer 120 situated on first side S1. The "cutout configuration" is formed from at least one cutout in protective layer 120. Generally, cutout configuration R can be formed from a single cutout or a single, i.e. coherent, cutout portion or from a plurality of cutout portions. In the case of the formation of cutout configuration R from a plurality of cutout portions, the latter can be situated beside one another and separate from one another, so that the latter do not verge into one another or are arranged contiguously.

In the embodiment shown in FIGS. 4 and 5, cutout configuration R is formed from two cutout portions R1 and R2 in the form of through-openings of protective layer 120. A first cutout portion R1 is formed from a plurality of branch portions R11, R12, R21, R22, which run together in a central cutout R3 or are connected to the latter. A second cutout portion R2 is constituted strip-shaped and extends along the extension of first cutout portion R1.

A cutout portion arises by the planar removal of material of protective layer 120 up to first surface 110a of base body 110. Provision can in particular be made such that the surface-portion configuration of surface 110a laid bare by cutout configuration R is the surface of the surface layer made of an oxide of a metal and, in the case of the formation of the material basic body from aluminium, of an aluminium oxide.

The planar removal can take place by vaporisation of the material of the protective layer in a predetermined decorative pattern. Vaporisation of the material of the protective layer is preferred, because with this process step it can be ensured in a particularly reliable manner that no residual material will remain on the surface of the base body inside the cutout configuration. The material is preferably vaporised with a laser. Vaporisation is understood here also to mean sublimation or ablation or a combination of sublimation and ablation. The cross-sectional representation shown in FIG. 6 shows a cutout R2 as such a through-opening of protective layer 120.

Cutout configuration R—viewed in cross-section along the extension thereof—is formed in particular by lateral faces RS, which are each formed from protective layer 120 and which lie facing one another, and a bottom face RB which border cutout RA open towards first side S1. Bottom face RB is formed by a portion of first surface 110a (FIG. 6).

FIG. 4 shows a step of the process in which the protective layer is removed in sections by evaporation by means of a laser according to a predetermined decorative pattern, so that a cutout configuration defined by the decorative pattern is formed in the protective layer. The coordinates of the decorative pattern are preferably stored in a data memory and are used by the laser to produce the decorative pattern in protective layer 120.

According to the invention, provision is made such that a deposition of sinterable material as a decorative-material intermediate layer 150 on first side S1 takes place in a subsequent step, in such a way that decorative material D as intermediate layer 150 at least covers the area in which cutout configuration R defined by decorative pattern M is formed in protective layer 120.

In particular, provision can be made such that a deposition of a dispersion of sinterable decorative material as a decorative-material intermediate layer 150 at first side S1 takes place in a subsequent step, in such a way that the dispersion as an intermediate layer 150 at least covers the area in which cutout configuration R defined by decorative pattern M is formed in protective layer 120.

Provision can be made such that intermediate product Z3 with base body 110, with mineral intermediate layer 150 and with plastic reinforcement 130 lies on a workpiece holding fixture H.

In this process step, provision can be made such that the sinterable decorative material is present in powder form and is introduced in powder form into cutout configuration R.

Alternatively, provision can be made such that the sinterable decorative material is present and deposited as a dispersion, e.g. as a binder dissolved in a solvent with decorative material in powder form introduced into the latter. A spraying device 155 is shown in this regard in FIG. 5.

The decorative material is sinterable in particular inasmuch as it can be hardened by heat input, in particular by means of a laser beam. Provision can be made such that base body 110 or plastic reinforcement 130 is held and fixed by a holding fixture H.

Layer 150 of decorative material comprises an outer surface 150a facing first side S1 and can be deposited relatively thinly. The thickness of the deposited layer can in particular lie in the range between 1 and 500 μm especially—viewed in the extension of intermediate product Z3—outside cutout configuration R. In particular, the thickness of the deposited layer can lie between 20 and 100 μm.

The decorative material, in particular the powdery decorative material, can comprise one or more of the following components or can comprise each of them respectively: ceramic powder, plastic, moulding sand, metal powder, polyurethane for example in particle form or in droplet form.

Furthermore, provision can be made such that the decorative material is deposited by spraying or by mechanical deposition. FIG. 7 represents a deposition by means of a spraying device 155. The deposition and optionally the distribution of the decorative material on first side S1 of base body 110 is in particular provided for in such a way that—viewed in particular in the extension of intermediate product Z3—a relatively thin uniform intermediate layer 150 of decorative material is situated on first side S1 of base body 10 inside and optionally also outside cutout configuration R.

In a further step, laser sintering of this decorative-material intermediate layer 150 takes place by means of at least one laser jet L1 of a laser device L (FIG. 8) inside cutout configuration R defined by decorative pattern M, wherein the area, viewed in the extension of intermediate product Z3, outside cutout configuration R is not sintered. At predetermined, i.e. desired or preprogrammed on the basis of predetermined decorative pattern M, points of decorative material layer 150, which lie inside cutout configuration R and in particular respective cutout portion R1, R2, laser energy is fed into the latter, as a result of which the material of the portions of decorative-material intermediate layer 150 which form the decorative pattern and which are situated inside cutout configuration R and in particular respective cutout portion R1, R2 are sintered locally (FIG. 8). A layer thus arises on base body 110, which is formed from hardened portions and optionally, viewed in the extension of intermediate product Z4, non-hardened portions situated outside cutout configuration R, wherein locally limited sintering of the decorative material has been achieved in the hardened portions. The intermediate product thus arising is referred to in FIG. 8 by reference symbol Z4.

The same laser is preferably used for the sintering as for the removal of the protective layer material. A resolution of better than 30 μm can be achieved by this process step.

In a further process step, removal of non-hardened portions 190 (FIG. 9) takes place, so that thereafter hardened portions 191 or generally the at least one hardened portion 180 of the intermediate layer and protective layer 120 outside the latter form the decorative layer with predetermined decorative pattern M. The intermediate product during the removal of non-hardened layer 190 is referred to FIG. 9 by reference symbol Z5. Portions 181, 182, 183 of hardened portion 180 of interior trim part 1 are represented in FIGS. 10 and 11, which are each situated in a respective branch portion R11, R12, R2.

The invention claimed is:

1. A process for producing an interior trim part with a decorative layer situated on a first side thereof and forming a decorative pattern for the interior of a motor vehicle, the process comprising the following steps:
   (a) forming at least one cutout configuration, defined by a predetermined decorative pattern, in a protective layer situated on a first side, which is situated on a first surface of a shell-shaped base body made of a metallic material,
   (b) depositing a sinterable decorative material on the first side in such a way that the decorative material, as an intermediate layer, covers at least the area in which the cutout configuration defined by the decorative pattern is formed in the protective layer, wherein the sinterable material also covers at least a portion of the area outside the cutout configuration,
   (c) laser-sintering the intermediate layer inside the cutout configuration defined by the decorative pattern in order to produce at least one hardened portion of the intermediate layer situated inside said cutout configuration,
   (d) removing the sinterable decorative material that is situated outside the cutout configuration defined by the decorative pattern, so that the at least one hardened portion of the intermediate layer and the protective layer outside the cutout configuration form the decorative layer with the predetermined decorative pattern.

2. The process according to claim 1, wherein the formation of the cutout configuration in the protective layer defined by the predetermined decorative pattern is produced by vaporization of the material of the protective layer according to a predetermined pattern.

3. The process according to claim 1, wherein the sinterable decorative material contains a mineral substance.

4. The process according to claim 1, wherein a dispersion of sinterable decorative material takes place when sinterable decorative material is deposited on the first side.

5. The process according to claim 1, wherein the sinterable decorative material is deposited on the first side in powder form.

6. The process according to claim 1, wherein the base body is formed from or comprises aluminum or an aluminum alloy.

7. The process according to claim 1, wherein an application of a plastic reinforcement takes place on a second surface of the base body, wherein the application of the plastic reinforcement takes by adhesive bonding and an adhesive layer is applied between the second surface of the base body and the plastic reinforcement.

8. The process according to claim 1, wherein an application of a plastic reinforcement takes place on a second surface of the base body, wherein, by back-molding of the base body at the second surface thereof, the plastic reinforcement is applied thereon.

9. The process according to claim 1, wherein the at least one cutout configuration is formed through the protective layer in step (a) so that at least some of the sinterable decorative material is in direct contact with the base body after step (b).

10. The process according to claim 1, wherein the sinterable decorative material is in powder form and deposited directly onto the first side in step (b).

11. The process according to claim 1, wherein step (c) is performed such that laser energy is fed into the intermediate layer only within the at least one cutout configuration so that the intermediate layer is sintered within the at least one cutout configuration and is not sintered outside of the at least one cutout configuration.

12. The process according to claim 1, wherein a laser is used to form the at least one cutout configuration in step (a), and the same laser is used to laser-sinter the intermediate layer in step (c).

13. The process according to claim 1, wherein step (d) is performed after step (c).

14. The process according to claim 1, wherein the protective layer is in the form of a continuous film before step (a), and step (a) comprises removing material from the continuous film to form the at least one cutout configuration.

15. The process according to claim 1, wherein step (a) comprises using a laser to remove material from the protective layer.

16. The process according to claim 15, wherein the same laser is used to laser-sinter the intermediate layer in step (c).

17. The process according to claim 1, wherein the protective layer is situated on said first side before step (a).

\* \* \* \* \*